March 13, 1934.  J. C. ROSS  1,950,749

SELF CLOSING ALL METAL FAUCET

Filed July 27, 1932

INVENTOR
James C. Ross.
BY
ATTORNEY

Patented Mar. 13, 1934

1,950,749

UNITED STATES PATENT OFFICE 1,950,749

SELF CLOSING ALL METAL FAUCET

James C. Ross, Seattle, Wash.

Application July 27, 1932, Serial No. 625,001

3 Claims. (Cl. 251—136)

This invention relates to all metal faucets, and particularly to faucets that are self closing, noiseless, non-leakable and without washers or packing.

And it specifically relates to improvements on the faucets illustrated and described in patents issued to me by the United States, and numbered 1,563,589 and 1,616,826.

In the use of faucets in hotels, and various public places it is desirable to prevent the waste of water, gas and other fluids that may be often caused by carelessness of the users, in leaving the faucets unclosed after using.

Various attempts have been made to provide faucets to close automatically, as by springs, etc., and in my former patents, I have shown another form therefor, but all such and other faucets have required packing of various sorts or washers to prevent leakage. Such things are subject to wear, and such forms of faucets expensive to construct for general commercial use, and require repairs to stop developing leaks. Other valves in use are also noisy in closing and often become leaky.

It is therefore one of the objects of this invention to provide a faucet that will close noiselessly, and automatically by the pressure of the fluid used, as soon as manual control is released, and to so operate without the use of springs, gaskets, washers or other soft packing.

A further object is to provide a control valve with a stem thereon slidably adjusted in a cylinder with grooves around the stem to provide a series of water seals between the stem and cylinder, with other checks to prevent an escape of fluid along the stem when the valve is open.

A further object is to mount such a valve and stem with a fluid pocket around the base thereof to provide a cushion for gradual and noiseless closing thereof;

And a still further object is to provide a valve that will automatically open and permit the free drainage of water from adjoining pipes and chambers, when pressure is removed, and thus to prevent freezing and bursting thereof in cold weather.

Figure 1:
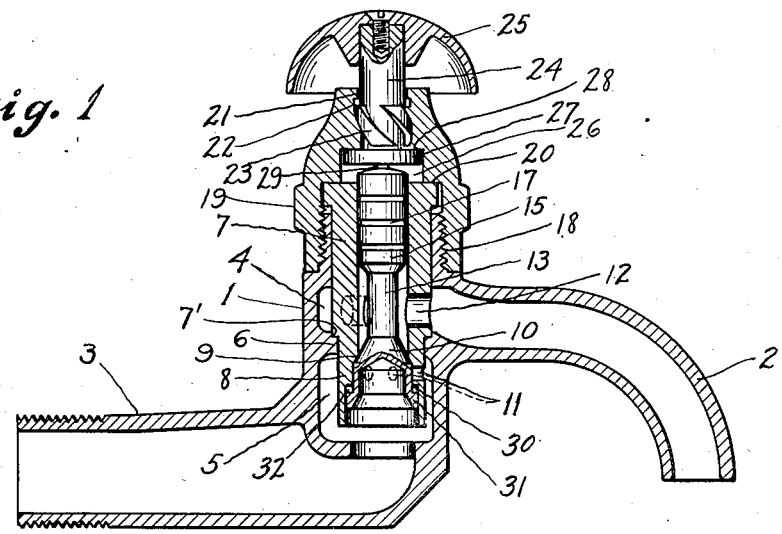
Figure 2:
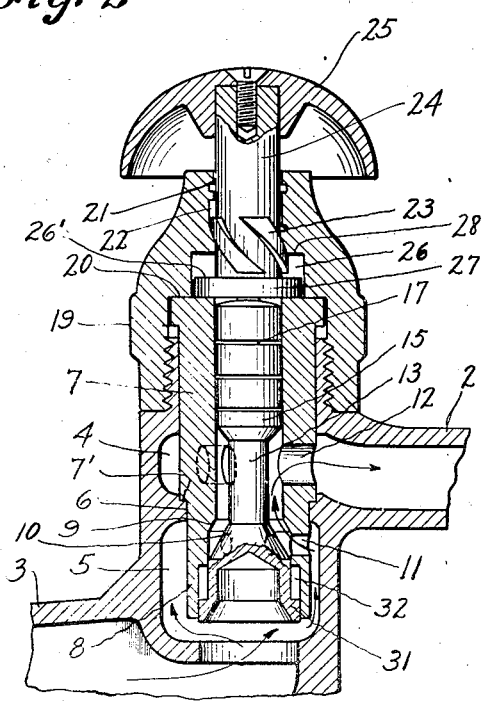
Figure 3:
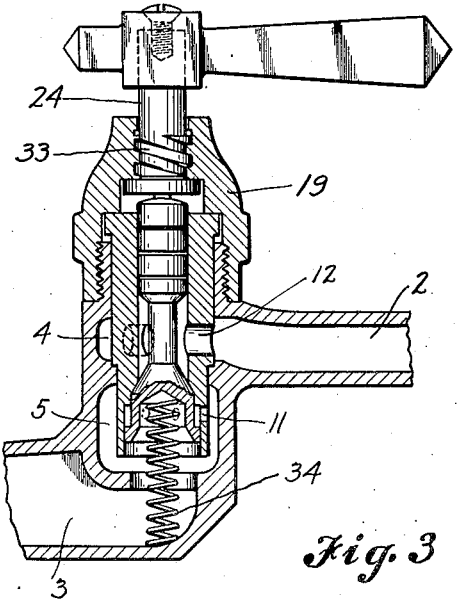

With these and other objects, hereinafter shown, I have illustrated my invention by the accompanying drawing, of which Figure 1 is a sectional side elevation of the faucet, with the valve closed, Figure 2 is an enlarged sectional view of the faucet with the valve open, and parts broken away, Figure 3 is a sectional view of the faucet with parts broken away, and an alternate form of actuating stem thread.

Like numerals on the different figures represent like parts.

Numeral 1 represents the main body of the faucet, which is preferably cast integral with the ordinary nozzle 2 and a tubular projection 3 for attachment to any service pipe or supply source for the fluid to be used. Cast in the body is an upper chamber 4 opening into the nozzle, and a lower chamber 5 opening into the tube 3.

The chambers are divided by a wall flange 6, and a tubular cylinder 7 which is separately formed with a shoulder 7' and then pressed down through the chambers till the shoulder fits fluid tight upon said flange.

The lower end of the cylinder forms a projection 8 into the chamber 5. This projection is provided with an interior valve seat 9, against which an elongated valve member 10 is normally compressed by pressure of fluid from the lower chamber. Thus all fluid is normally prevented from flowing into the upper chamber and out through the nozzle, until the valve is depressed from its seat.

In order to provide passageways for the fluid from the lower chamber to the upper, a series of intake parts 11 are provided through the walls of the extension below the valve seat. (These ports 11 are preferably small to also serve as strainers to prevent large grit or other undesirable matter passing therethrough and thence from the nozzle.) Through the walls of the cylinder above the flange, any suitable number of large discharge ports 12 are provided, so that when the top shoulder of the valve 10 is depressed below the ports 11, the fluid flows freely from the lower chamber into ports 11 and then out from ports 12 to the upper chamber and from the nozzle as indicated by arrows on Figure 2.

The valve is constructed with stem 13 which is reduced in diameter at its lower portion to provide space for passage of fluid about the same. The upper portion of the stem is enlarged to form a plunger 15 which is slidably adjusted through the upper portion of the cylinder 7, so that when the valve is seated the top of the plunger is positioned slightly above the top of the cylinder, and when the top of the plunger is depressed level with the top of the cylinder, the valve is then suitably depressed to open the intake ports 11. This plunger is provided with a series of grooves 17 around the same, which become filled with fluid from a slight seepage from the upper chamber, and when so filled, especially with a liquid, a seal is formed between the plunger and the inner walls of the cylinder which retards any leakage or any discharge of fluid from the top of the cylinder, and also effectually prevents vibration and chattering noises when the valve and plunger are raised or lowered.

The body 1 is provided with an outer threaded boss 18 above the chambers, through which the cylinder is pressed with a liquid tight joint. An interiorly threaded gland nut 19 is screwed tightly down over this boss and carries a shoulder 20 which makes a liquid tight closure, over the outer edge of the cylinder. The upper portion of the nut 19 is provided with a central hole 21 in line above the plunger and this hole is provided with interior grooves or wide high pitched threads 22 which mesh over a corresponding outer thread 23, on the outside of an actuating stem 24 which in turn is operatively positioned through the hole. A handle 25 is affixed on top of the stem for manually turning the same to open the valve. The lower portion of the nut is counterbored as 26, and the lower end of the stem is enlarged with a head member 27 operatively positioned within the bore. The central portion of lower face of this head 27 contacts with the top of the plunger 15 at all times, so that when the stem is depressed by the handle 25, the lower valve is opened, and when the handle is released, the liquid pressure beneath the valve forces the plunger and stem 24 upward till the valve is seated and closed. The high pitch of the thread permitting this automatic closing with slight resistance.

When the head member 27 is depressed and the valve opened thereby, then the outer portion of the lower face of the head binds upon the cylinder top around outside the plunger head, and thus forms a liquid tight joint at this point and prevents leakage while the liquid is flowing through the faucet. Again when the plunger is forced upward by the liquid pressure against the valve to close the same, the head is forced up by the plunger till the outer top flange 28 thereof is compressed against the face of the shoulder at the top 26' of the bore, and a liquid tight joint then formed to prevent any leakage by the stem, in event of any leakage past the valve. When the normal pressure of the liquid in the lower chamber is very low, it is desirable to reduce the top bearing face of the plunger to a small area, as a nipple 29 to lessen the friction between this turning point and the head 27. But with ordinary service pressure of liquids the top bearing face of the plunger may be larger to increase the friction and reduce the speed of the uprising valve.

To further assure a gradual closing of the valve and so prevent all "pounding" noises which are common with many other valves, a dashpot action is provided at the bottom of the cylinder and valve member as follows:

The lower extension of the cylinder is counterbored to provide a shoulder 30 below the intake ports 11 and a narrow flange 31 is provided around the lower end of the valve member 10, which slides loosely in counterbore. An area 32 filled with fluid exists at all times between the top of this flange and the top of the counterbore. When the valve is depressed this area or pocket is enlarged and fills with fluid, which can only be forced out gradually past the flange when the valve is raised to closed position; and this assures a gentle noiseless closing as desired.

When the pressure of water is cut off as for draining the pipes in cold weather, the weight of the valve and plunger will cause the valve to sink below the valve seat and permit complete drainage. This faucet may also be used with all its advantages except self closing, in all places where it is desired to control the valve manually, as for a continuous or extended flow of fluid. In Figure 3 is shown a modification therefor, by the adaptation of an ordinary low pitch thread 33, on the actuating stem 24, with a corresponding thread in the top of the gland nut 19. Such low pitched threads will not be actuated by fluid pressure against the valve.

The two differently formed nuts and threaded actuating stems are preferably made interchangeable for adjustment in different locations.

Where the pressure of fluid used is lower than ordinarily found in service connections, or too low to close the valve, a light spring 33 may be placed beneath the same as indicated in Figure 3. But such springs are unnecessary for ordinary uses of the faucets, particularly for city water connections.

It will be readily understood that various modifications may be made in the construction of the faucet, and in the form of the body and attachment portions thereof to make it adaptable for wash basins and all places for domestic utility, without departing from the scope of my invention and claims.

Having described my invention I claim as new for Letters Patent:

1. A self closing faucet having a body member and an intake and an outlet chamber therein, a tubular cylinder mounted in the body for normally separating the chambers, intake ports through the sides of the cylinder from the intake chamber, outlet ports through the sides of the cylinder to the outlet chamber, a valve seat in the lower portion of the cylinder, and a valve member slidably mounted in the cylinder beneath the seat adapted to be normally pressed against the same and to close said intake ports and to close the port surrounded by said seat by pressure from fluid in the intake chamber, a stem attached to the valve and extending up through the cylinder, the upper portion of the stem enlarged for a guide plunger, grooves around the plunger to provide a liquid seal against the inner walls of the cylinder to retard any seepage of fluid above the same, and to prevent chatter of the plunger, a gland nut attached to the body member, an actuating stem adjustably mounted on high pitched threads through the gland in line above the plunger, the lower end of the actuating stem abutting upon the top of the valve stem and adapted to depress the valve when the same is to be opened by manual pressure, and adapted to rise and permit the valve to be closed by fluid pressure below when the manual pressure is released.

2. In a washerless self closing faucet, comprising a tubular cylinder mounted in the faucet body for guiding a valve at the base thereof and for guiding a plunger extending from the valve, the top of the plunger normally raised above the top of the cylinder by liquid pressure below the valve, a gland nut affixed above the cylinder, provided with a high pitched threaded aperture over and in line with the plunger, an actuating stem threaded through the aperture the base thereof in constant contact with the top of the plunger, and adapted to depress the plunger and valve by manual pressure upon the top of the stem, a counterbore in the base of the nut of greater diameter than the plunger, a flanged head on the base of the stem slidably disposed in the bore, the lower flange face adapted to close liquid tight over the top of the cylinder when the plunger is depressed to prevent the leakage of any fluid from the top of the cylinder without the use of packing or washers, the upper flange face adapted to seat against the top shoulder of the bore when the valve is closed and the plunger raised, to thereby prevent without packing or washers any fluid leakage past the head and from the aperture above.

3. In a self closing faucet, comprising a tubular cylinder in the body thereof having a valve seat, a valve slidably mounted in the lower portion of the cylinder and adapted to be closed by pressure thereon from fluid below the same, means for manually opening the valve, means for retarding the closing speed movement of the valve, said manual valve opening means having means for preventing noises from the movement of the valve and actuating parts of the faucet, comprising a guide plunger extending above the valve and slidably disposed in the cylinder with slight space between the same to permit liquid seepage for a film seal, a series of open grooves around the plunger to receive liquid seepage and provide liquid cushions of sufficient depth to soften and retard vibration of the plunger when operated.

JAMES C. ROSS.